United States Patent [19]

Plachy

[11] Patent Number: 5,107,892

[45] Date of Patent: Apr. 28, 1992

[54] WEIR CONSTRUCTION FOR LIQUID DISTRIBUTORS

[76] Inventor: Richard F. Plachy, P.O. Box 187, West Peru, Me. 04290

[21] Appl. No.: 652,036

[22] Filed: Feb. 6, 1991

Related U.S. Application Data

[63] Continuation-in-part of Ser. No. 426,567, Oct. 23, 1989, abandoned.

[51] Int. Cl.⁵ .............................................. E03F 11/00
[52] U.S. Cl. .............................. 137/561 A; 137/561 R
[58] Field of Search ........................ 137/561 A, 561 R

[56] References Cited

U.S. PATENT DOCUMENTS

| | | | |
|---|---|---|---|
| 1,243,682 | 10/1917 | Bailey | 73/215 |
| 1,505,050 | 8/1924 | Lauritsen | 73/215 |
| 2,025,722 | 12/1935 | Camp | 405/87 |
| 3,011,723 | 12/1961 | Weele | 239/193 |
| 3,158,171 | 11/1964 | Eckert | 137/262 |
| 3,273,872 | 9/1966 | Eckert | 261/96 |
| 3,420,443 | 1/1969 | Van Koppen et al. | 137/561 R |
| 3,491,792 | 1/1970 | Eckert | 137/561 R |
| 3,497,067 | 2/1970 | Tyson | 210/259 |
| 4,034,607 | 7/1977 | Martig, Jr. | 73/215 |
| 4,267,978 | 5/1981 | Manteufel | 137/561 A |
| 4,298,470 | 11/1981 | Stallings | 210/170 |
| 4,605,501 | 8/1986 | Tyson | 137/561 A |

Primary Examiner—John Rivell
Attorney, Agent, or Firm—Jones, Tullar & Cooper

[57] ABSTRACT

A composite weir construction for evenly dividing liquid flows in conduits or containers having a liquid-gas interface under the influence of gravity or accelleration is presented. In particular, this device is for flows wherein clogging of narrow weirs is a problem, and where weir elevation differences are also a problem. When these weirs are placed in the flow, new weirs are gradually formed which is are composites made from the clogging agent and the original weirs. These new composite weirs are very accurate in flow division over a wide range of flows in spite of substantial vertical misalignment of the original weirs.

2 Claims, 5 Drawing Sheets

WEIR CONSTRUCTION FOR LIQUID DISTRIBUTORS

CROSS REFERENCES TO RELATED APPLICATIONS

This application is a continuation in part of prior U.S. patent application, Ser. No. 07/426,567, entitled "Weir construction for Liquid Distributors" filed by the applicant herein, Richard F. Plachy, on Oct. 23, 1989 now abandoned. The entire disclosure of this earlier application is incorporated into this specification by reference.

BACKGROUND OF THE INVENTION

The proposed invention is a device whose sole purpose is to evenly divide a flow into two or more equal streams. This invention is only for free flows in pipes or containers having a liquid/gas interface under the influence of gravity, centrifugal force, or acceleration.

When a subsistence farmer in Asia wishes to divide the irrigation water into two or more parts, he simply hoes out a shallow trough in the sides of the main irrigation ditch to conduct water to lateral irrigation ditches. If two of the shallow troughs are near each other and about the same shape, length and depth (as measured from the water surface), the flow will be divided more or less evenly. This sort of liquid flow dividing is what the proposed invention is for, but the proposed invention has unique features that make it vastly superior to these hoed troughs. Both this invention and the hoed troughs are simply types of weirs, however and thus are variants on a very old concept.

The primary use for this invention is when the head at the two weirs is different. This difference might be due to vertical misalignment of the weirs, surging due to flow patterns, or other causes. In such a case division of the flow by a V-notch weir or a rectangular notch weir is generally unsatisfactory due to the large difference in the flow over the two weirs. This is especially true at low flows where there may be little or no flow over the weir with the lower head. A normal "V" notch weir will almost triple the flow if the head above the notch bottom changes by a factor of 1.5. This implies that even a slight vertical misplacement of one of the weirs would result in a considerable difference in the amount of flow through that weir. This is one of the central problems in using weirs to divide the flow.

Prior art efforts to solve these problems have included narrow notch weirs. This does minimize the problem at low flows because the total head is raised making the head differences small compared to the total head. There are at least two significant problems with this approach. First, the narrow opening is quite subject to clogging in many (if not most) open channel applications. Second, it has a very small dynamic range. That is, if it is accurate in dividing the flow at, say, 0.2 gallons per minute, the maximum flow for a device with reasonable total height might be only 0.5 gallons per minute.

In order to overcome these disadvantages prior art includes the modified combination V-notch and narrow rectangular notch weir. The lower portion of the "V" in a V-notch weir ends in a narrow rectangular notch weir which goes still lower (mainly for use at low heads). This device does solve the problem in part, but also has some disadvantages. The low flow portion (the narrow slot) is still subject to clogging. The high flow region uses the inaccurate V-notch so that a small error in vertical alignment or head will cause a significant error in flow dividing for medium flows. The present invention solves these problems in flows subject to weir clogging such as wastewater flow division, cooling water flow division, irrigation water flow division or slurry flow division.

In flows containing a clogging agent, such a buildup of the clogging agent can cause uneven distribution or malfunction of some sort. With the present invention, however, this buildup is actually used to perfect the division of flow!

This invention has particular application in septic systems. A typical system consists of a septic tank, a distribution box or "Tee", two or more subsurface absorption areas, and the associated piping. Flow division takes place in the distribution box, often made of concrete. The walls of this box have holes or knockouts through which four inch distribution pipes are inserted. The open ends of the four inch pipes serve in lieu of flow dividing weirs.

Thus if one distribution pipe is higher than another—an inevitable occurrence—the flows will be unequal. The flow rate through the lower pipe will have to reach some minimum value before the head inside the box rises enough for there to be any flow at all through higher pipes. This means that any distribution box is a very poor divider for low flow rates. Unfortunately, since the boxes are always installed so that they are downstream from a large reservoir (the septic tank), the average flow rate is very low in practice and the resulting distribution poor. Even if perfect flow is achieved when the system is first installed, later movement and settling will cause a variation in the outlet pipe elevations.

Prior art has tried to solve these problems in septic systems by dropping the effluent over a knife edge as a means of flow division as shown in U.S. Pat. No. 4,605,501 to Tyson and U.S. Pat. No. 3,497,067 to Tyson, by using dosing systems which thereby transiently increase the flow rate, and by using orifices whose height is adjustable over the pipe as shown in U.S. Pat. No. 4,298,470 to Stallings. None of these options have been successful enough to be generally accepted.

BRIEF SUMMARY OF THE INVENTION

After much study and research into the above mentioned problems and possible solutions therefore, applicant has developed an improved distribution means which will allow division of a liquid stream into two or more equal parts with relative accuracy, even when some the outlet pipes from the distribution means were initially displaced a substantial amount vertically, and even at low flow rates. The invention is also useful when the distribution means is a pipe fitting such as a "Tee". The primary use for this invention is in flow distribution for flow streams containing elements which adhere to parts of the system or which support a growth adhering to parts of the system.

It is, therefore, an object of the present invention to provide an improved means for division of a liquid flow stream into equal parts.

Another object of the present invention is to provide a flow distribution means that will provide good flow division in spite of any initial or subsequent vertical misplacement of the outlets.

Another object of the present invention is to provide a flow distribution means that will provide good flow division at low flows.

Another object of the present invention is to provide a process for creating an improved distribution means as related above.

Another object of the present invention is to provide a process for dividing a flow such that the process will tend to maintain the equal division even if one or more outlets are raised or lowered before or during the process.

Another object of the present invention is to provide an apparatus for flow division based on these principles and having the same advantages.

Another object of the present invention is to provide such distribution means or device or process or apparatus specifically to solve the problem of equal flow division of septic tank effluent.

Another object of this invention is to provide a weir shape for use in attempting to equally divide flows containing elements which will adhere to the weirs, and wherein the outlet elevations with respect to the flowing liquid surface are unequal, such that the range of elevation difference for which a set of weirs might be used to try to compensate for these differences in outlet elevations is greatly extended over any prior art.

Another object of this invention is to provide a range of weir shapes for use in attemting to equally divide flows containing elements which will adhere to the weirs, and wherein the outlet elevations with respect to the flowing liquid surface are unequal, such that the range of elevation difference for which a set of weirs might be used to try to compensate for these differences in outlet elevations is greatly extended.

Another object of this invention is to provide a means of improving the performance of these composite weirs by causing the edges of the weir opening to be artificially ridged or roughened for better shape and adhesion for the secondary weir.

Another object of this invention is to provide a means of improving the performance of these composite weirs by making the material of the original weir much thicker, thus allowing more reliable secondary weir buildup with larger weir openings.

Other objects and advantages of the present invention will become apparent and obvious from a study of the following description and the accompanying drawings.

To accomplish these objects, a new type of weir is proposed. This weir is designed so that the lowest portion will be narrow enough to clog with adherent elements from the flow or growths supported by the flow. The upper portions of the weir are designed so that the opening is too wide to be bridged by these same elements or growths. There will then be a part of the opening that may or may not be clogged depending on the elevation of the particular weir relative to the average flow and depending on the maximum flow rate experience at that weir. This adjustable clogging region is a large fraction of the total height of this weir opening, thereby differing significantly from any prior art. This specially designed weir is a useful new device in that it allows us to create what might be called a "secondary weir" which is the weir formed within the opening of the original weir. This secondary weir is formed from the adherent elements or growths. Any flow then takes place over this secondary weir. This secondary weir will tend to grow or shrink in such a way as to keep the flow channel over its upper surface just below the level of the fluid in the container means during low flows. Thus it forms a self-adjusting weir system when two or more weirs of this type are used to divide the flow. This then involves novel devices such as the original weir, and the composite weir having both original weir and secondary weir; novel processes such as the process for forming and adjusting the secondary weirs on all weirs or the process for dividing a flow stream in a self-adjusting way so that the outputs will remain equal in spite of moving outlet positions up or down; and, apparatus such as flow dividing apparatus based on any of these as a means of dividing a flow of liquid into equal parts though the outlets are at somewhat different or changing elevations.

BRIEF DESCRIPTION OF THE DRAWINGS

While the novel features of the weir construction for liquid distributors in accordance with the present invention are set forth with particularly in the appended claims, a full and complete understanding of the invention may be had by referring to the detailed description of the preferred embodiment which is presented subsequently, and as illustrated in the accompanying drawing figures in which:

DETAILED DESCRIPTION OF THE INVENTION

Figure 3:
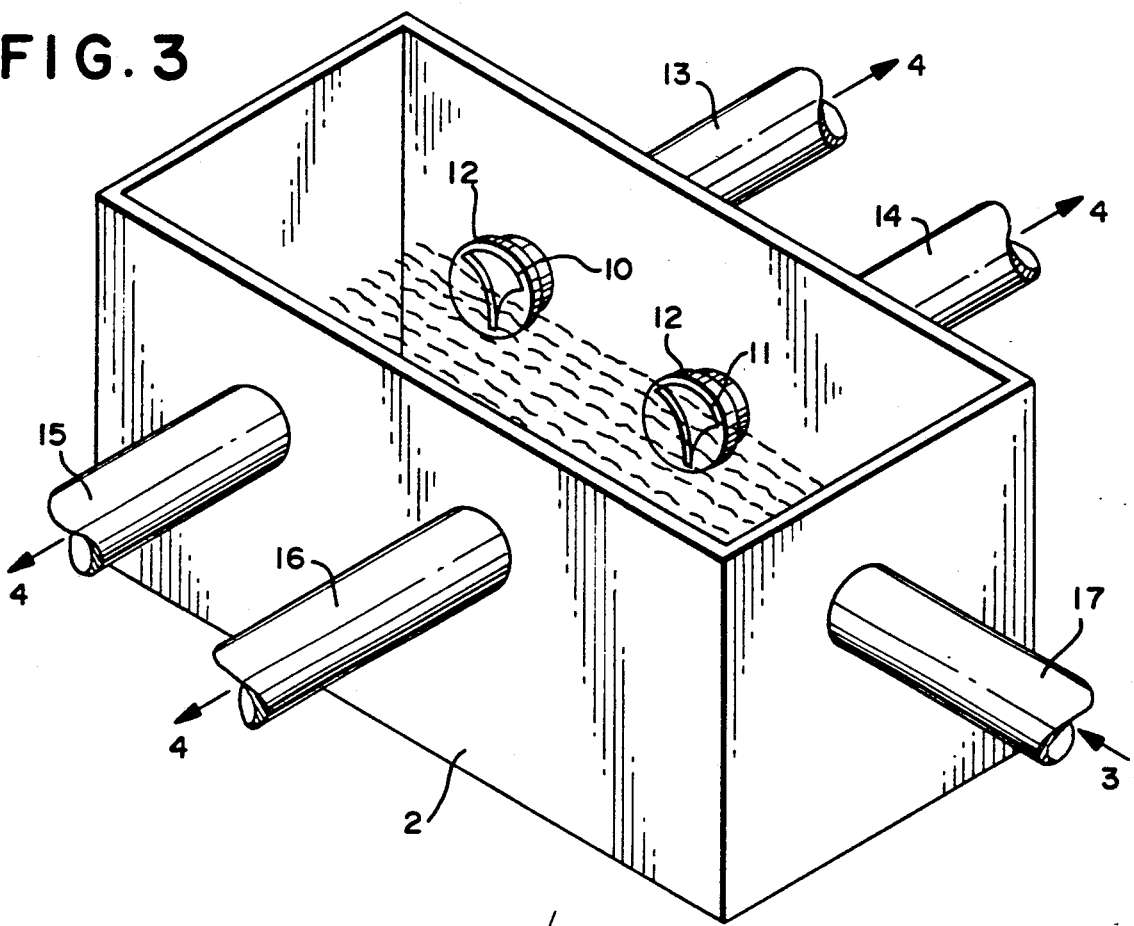
FIG. 3 is a perspective view of a distribution box for subsurface wastewater disposal utilizing weirs in accordance with the present invention.

This detailed description will use the preferred embodiment shown in FIG. 3. This figure shows a distribution box 2 of the type customarily used in conventional septic systems in order that the inlet flow coming from the septic tank via the inlet pipe 17 might be equally divided among the outlet pipes 13 14 15 16, each outlet pipe usually bringing the flow to a separate drainage area. FIG. 3 shows caps 12 over the ends of the outlet pipes 13 14 15 16, each said cap containing a weir of the type disclosed herein 10 11. This weir shape being shown in more detail in FIG. 1 at 5, and in FIG. 4. A prior art distribution box would not have these weirs. It should be noted that either through mismounting of the pipes or box, or subsequent settling of the box, the outlet pipes 13 14 (and the associated weirs 10 11) are at differing heights with respect to the effluent liquid inside the box 2.

Flow division in a septic system is a particularly apt use for this invention because the effluent from a septic tank contains finely divided organic matter which tends to form a thick adherent layer over all parts of the system contacted by said effluent. This adherent layer has little structural strength, and will not span wide gaps to form dams holding back the flow appreciably. It will span narrow gaps, however, and has enough strength to maintain a plug or dam across a narrow opening in spite occasional high heads and high flow rates.

Figure 1:
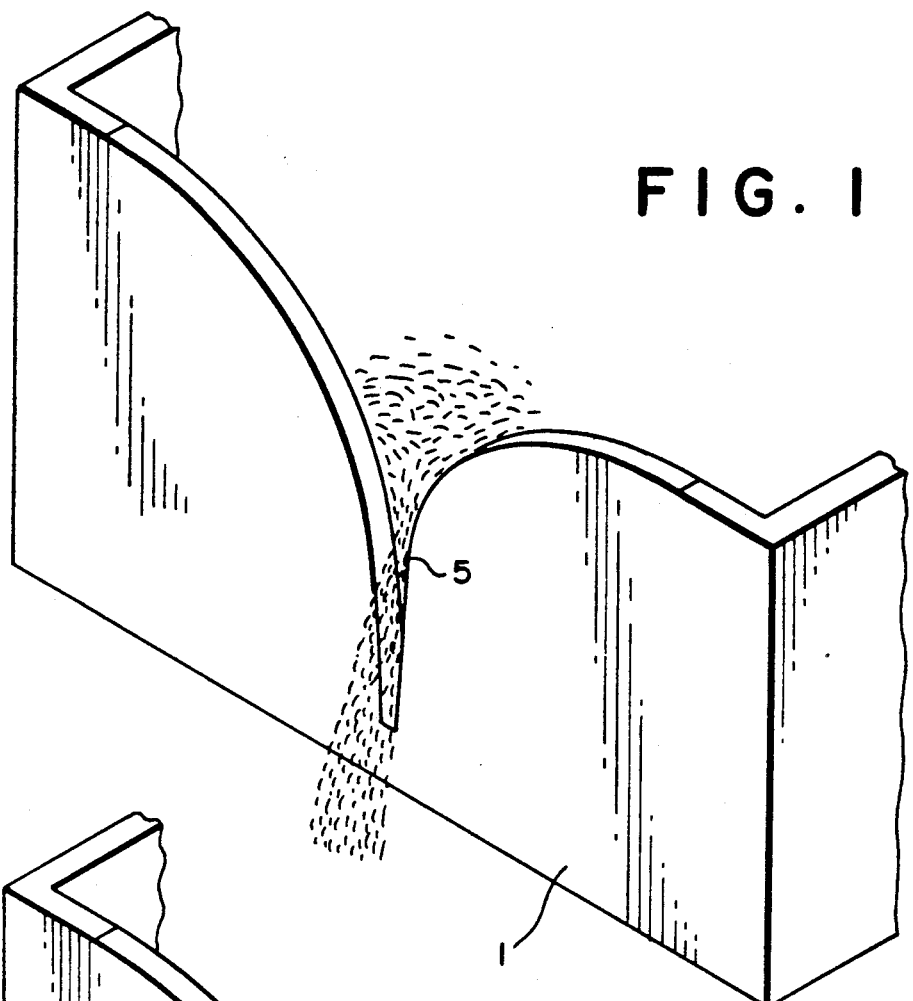
FIG. 1 is a perspective view of a preferred embodiment of a weir in accordance with the present invention.

The proposed invention begins with a multiple weir construction, as in the said distribution box, using weirs shaped like those shown in FIG. 1, which are (or might be) at differing heights with respect to the effluent liquid. These I will call the "original weirs". I will refer to the notches in the "original weirs" as the "original notches". The exact shape for each application must be determined, but the device is quite tolerant in most applications and will operate well though the exact best shape may not be used.

Figure 2:
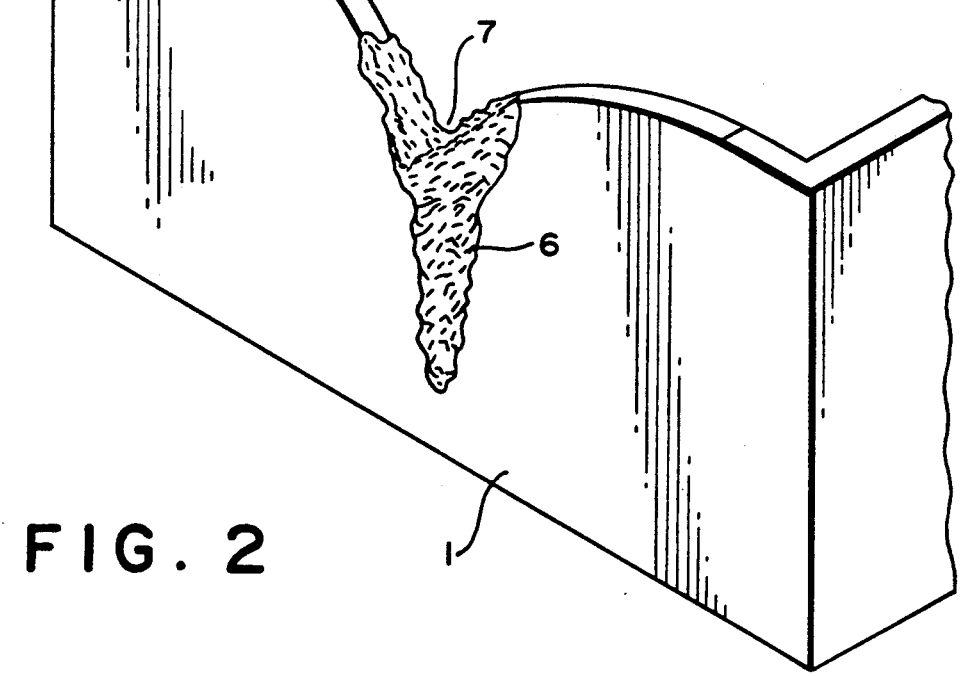
FIG. 2 is a perspective view of the weir of FIG. 1 and showing the weir after clogging by elements associated with the flow of material through the weir.

The operating principle involves a synergistic use of the clogging mechanism. After installation of the original weirs and clogging by the flow, the combination of original weir 5 and clogging medium 6 might appear as in FIG. 2. The clogging will not occur above the water line, so that the level of clogging will tend toward the average water line. Further filling will now raise the water level. It may be seen that the clogging agents will usually form a new "weir" 7 held at the edges by our original weir. This new weir is herein called a "secondary weir".

Figure 5A:
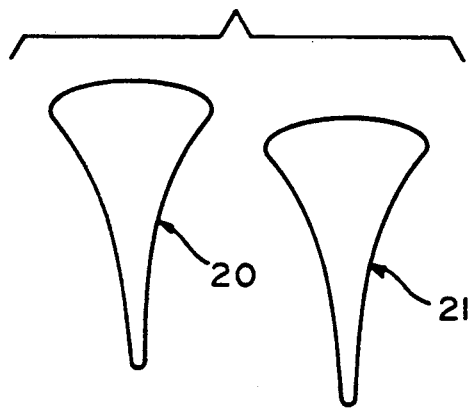
FIGS. 5A-5F show the formation and self-adjustment of a composite weir in accordance with the present invention.
Figure 5B:
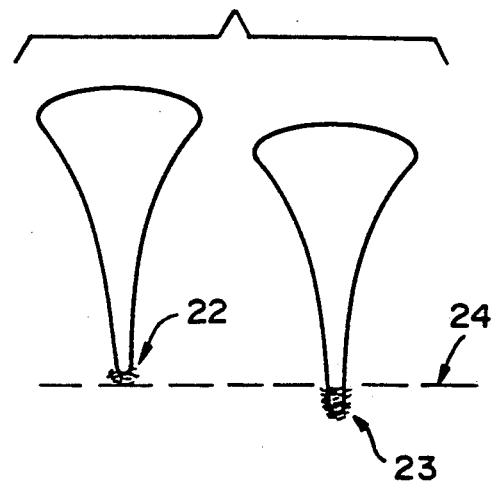
Figure 5C:
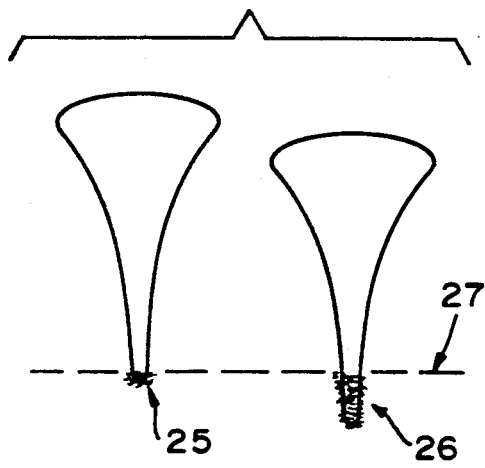
Figure 5D:
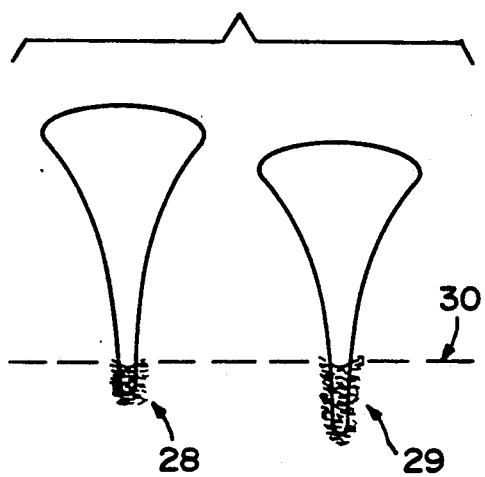
Figure 5E:
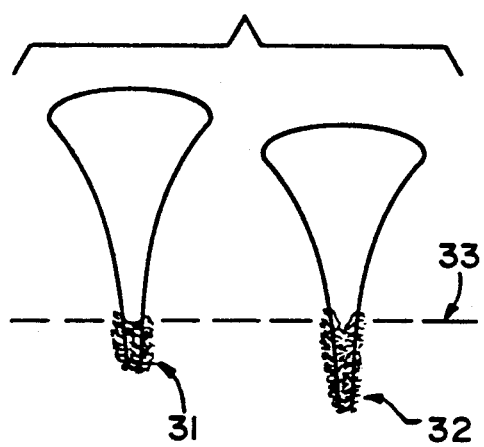
Figure 5F:
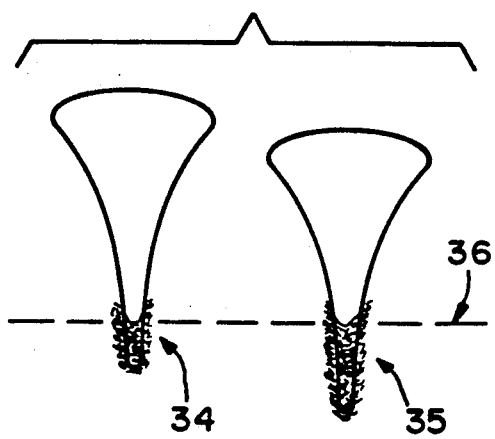
Figure 6A:
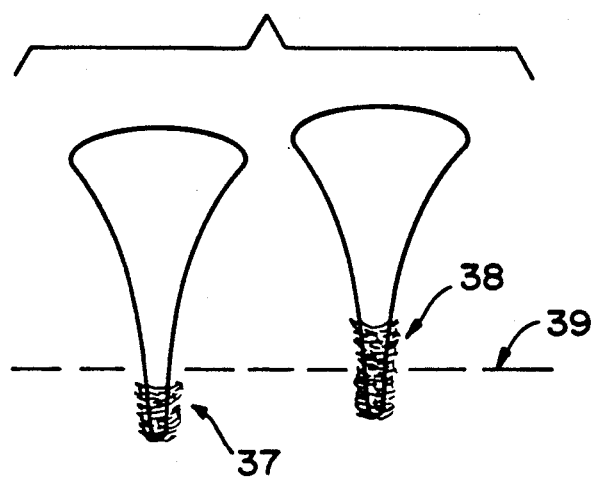
FIGS. 6A-6C show further formation and adjustment of a composite weir.
Figure 6B:
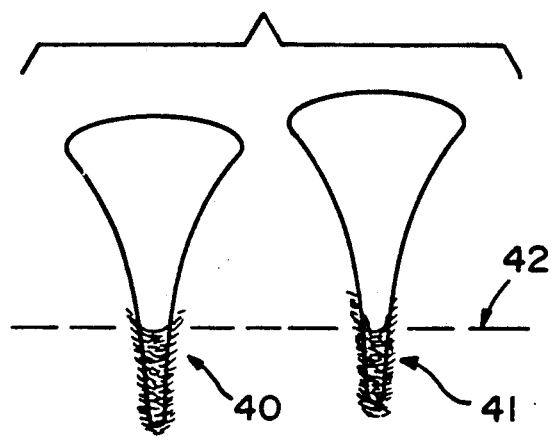
Figure 6C:
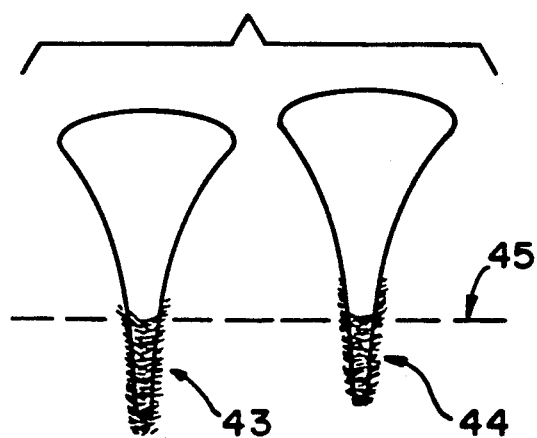

The process of forming the composite weirs (the combination of the original weirs and the secondary weirs formed from adherent elements from the fluid), and the subsequent self adjustment if the vertical positions of the weirs are changed proceeds as follows. The process will begin with weirs mounted at substantially different heights as shown by weirs 20 and 21 in FIG. 5A. As the liquid level rises in the container means, the process for generating a weir construction capable of adjusting to compensate for errors in the vertical placement of one or more weir openings such that equal flow division is maintained will begin; said process comprising the following steps:

A. having a multiple weir assembly all the weirs of which are similar, said weirs providing the outlet from some container means into which a fluid is flowing,
B. said fluid having some elements therein which are capable of adhering to or growing on said weirs,
C. said weirs having been so constructed that the accretions of adherent elements from the flow can partially block the lower portion of the weirs, but will not have the structural strength to maintain a blockage across the upper part of the weirs, the width of the weir openings increasing steadily from the lowest part of the weirs to the highest part of the operating portion of the weirs, said weirs being described as higher or lower meaning the relative elevations of the bottom of each weir as measured from the surface of the flowing fluid at each weir,
D. the fluid is then allowed to flow so that said accretions build up on the weirs, with the fluid flowing over the accretions (accretions shown as 22 and 23 in FIG. 5B), (24 is the low flow liquid level in the container means for flow apparatus with variable input flow rates, or the equilibrium flow rate for flow apparatus wherein incoming the flow rate is constant)
E. the accretions then block the lower part of the weirs, causing an increase in the head of fluid in the container means and against the weirs (accretions 24 and 25 in FIG. 5C), (27 is the—now higher— low flow liquid level in the container means for flows with variable input flow rates)
F. this increased head then causing the accretions to occur at still higher levels on the weirs (FIG. 5D),
G. these accretions then block still more of the weir, until
H. the greater weir opening width for the lowest weir as measured at the fluid surface causes the uppermost part of that weir to lack the strength to bridge the gap and it breaks away (top of accretion 32 in FIG. 5E),
I. the fluid level drops very slightly essentially stopping the accretion on all other weirs, but allowing it to continue to rebuild the small top portion of the accretions that broke away on the lowest weir, very little accretions occurring on the higher weirs during this time (FIG. 5F),
J. this accretion on the lowest weir again loses a small amount of the top of the accretion across the opening,
K. steps I and J are repeated again and again providing a condition where the top of the accretion across the opening in the lowest weir varies only slightly up and down, and the accretion across the others is largely confined to being just below the water line at low flows, this negative feedback mechanism then provides a set of weirs with their attendant accretions that operate so that
L. the flows are divided essentially equally (FIG. 5F), in spite of the original construction having one weir lower that the others, and this condition remains until one or another weir moves so as to become lower than the formerly lowest weir thereby causing (in FIG. 6A, opening 20, the left hand weir opening, has suddenly moved lower than weir opening 21, the right hand weir opening- though it had been higher in FIG. 5)
M. that new lowest weir to undergo the same process of adjustment as did the original lowest weir (FIG. 6B), while
N. any accretions on other weirs above the fluid line dry up, wither and otherwise become less so that
O. the steps I and J will be repeated so that steps K and L are repeated for this new configuration so that this continuing process based on negative feedback continually adjusts to keep the tops of the accretions in the fluid at the same elevation (FIG. 6C), thereby causing the fluid flowing out of the container means over these accretions to be divided into equal streams though the weir elevations change substantially.

The lower portion of the original weirs must have a narrow shape like that in FIG. 1, or the clogging material will either break off where it attaches to the original weir or be unable structurally to maintain the span across the gap during occasional higher flows. After partial clogging, the new composite weir is formed from the original weir as modified by the clogging agent. The new composite weir has all the high flow rate advantage of a V-notch weir so that high flows would still be divided evenly in spite of slight vertical misalignment of some weirs. Surprisingly, however, we can see that the "weir" 7 formed by the clogging agent will usually be at the same head level on each weir, in spite of the fact that the original weir heights are substantially different. Thus the composite weir has corrected for any original differences in head between weirs. This means that this composite device will also be accurate for division of low flow rates containing a clogging agent, even when the outputs are misaligned vertically. This is a critical point wherein this invention improves over prior art. Some prior art weirs would allow adjustment by formation of a secondary weir as described above; but, these prior art weirs would have negligible range of adjustment. They would work only so long as all the weirs were mounted at substantially the same elevation with respect to the surface of the liquid flow being divided.

Figure 4:
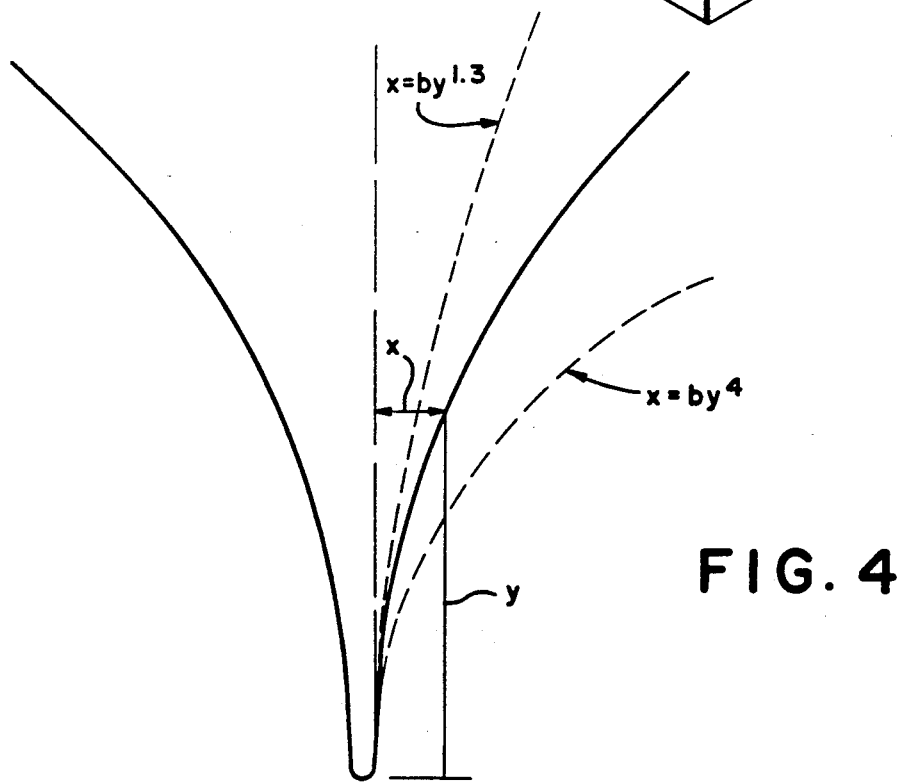
FIG. 4 shows a preferred shape of a weir opening of the present invention and its theoretical boundaries.

It is necessary that the original weir be carefully designed. If it widens too slowly, the entire notch may become clogged from bottom to top. But, if it widens too rapidly, it will be too wide just above the desired bridging level and the clogging material will not have the structural strength to maintain itself hanging across the gap. As with any weir used in such a fashion, there will be some slight ability to self-adjust to follow changing weir elevations, but the range of elevation differences that can be corrected with such a misdesigned weir will be negligible. Above the height of anticipated clogging, the original weir could widen more quickly with increasing height. This extra widening would be to accommodate a greater range in flow rates than would be obtained with a very acute V-notch, for example. FIG. 4 shows how—in the preferred embodiment—the shape for the weir opening is formed by curves that are monotonically increasing and the shapes of these curves are such that the curves are bound between $x = by^{1.3}$ and $x = by^4$, where x is the abcissa (increasing half notch width) and y is the ordinate (increasing height above the bottom of the notch.

Figure 7:
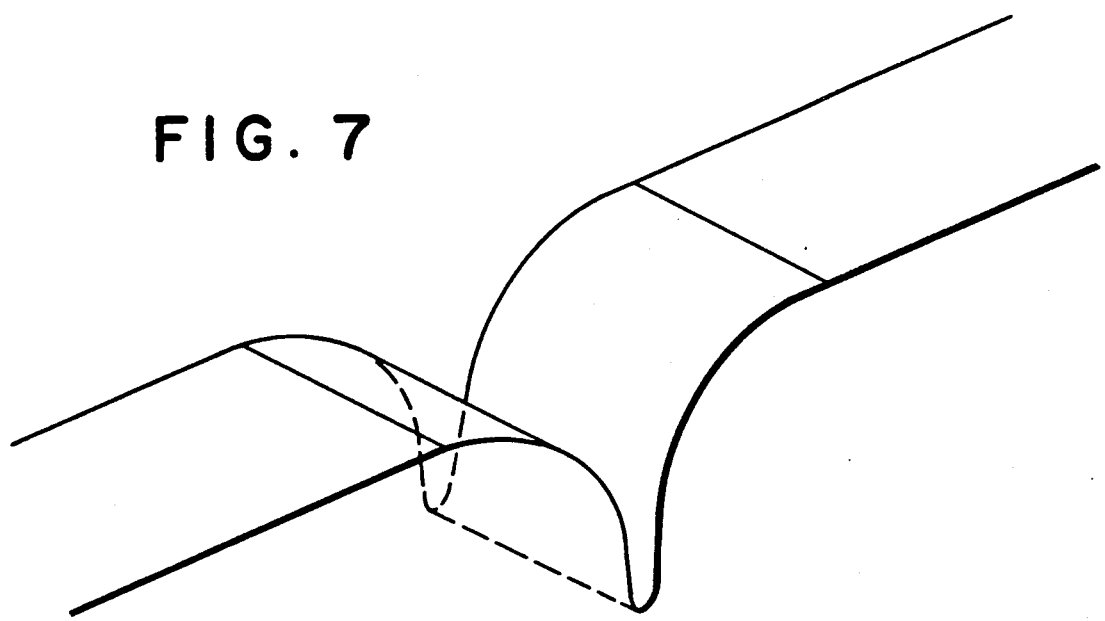
FIG. 7 is a perspective view of a weir opening in accordance with the present invention.

If a thicker material is used for the weir, this would allow the opening width across the lower part of the weir to be somewhat larger. This would have some advantage. This is shown in FIG. 7.

Figure 8A:
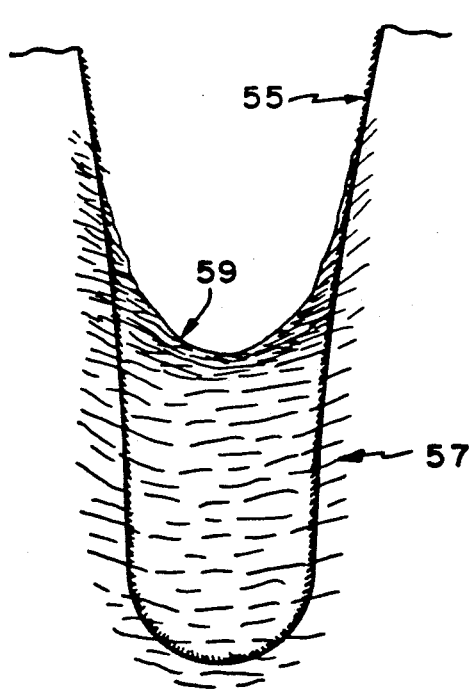
FIGS. 8A and 8B are front elevational views of a composite weir in accordance with the present invention.
Figure 8B:
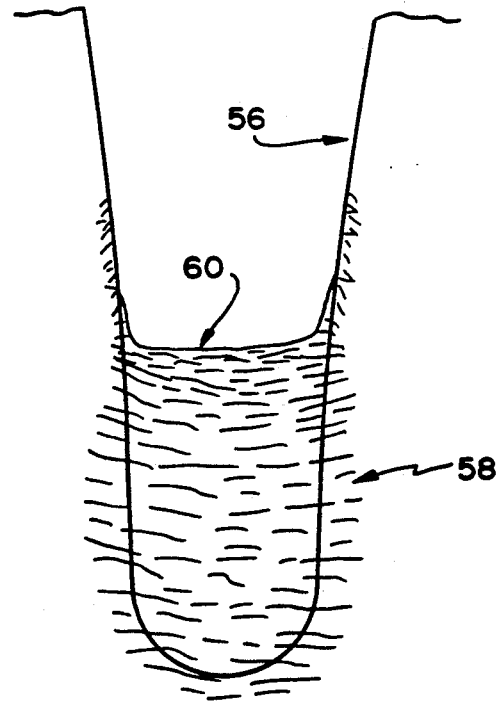

Similarly, if the edges of the weir opening are rough, it will allow better adhesion of the clogging or growing elements forming the secondary weir. This will allow a more desireable "U" shape in the resulting secondary weir. FIG. 8B shows the sort of shape expected for the secondary weir 60 when the weir 58 has edges 56 that are very smooth. FIG. 8A shows the sort of shape expected for the secondary weir 59 when the edges 55 of the opening 57 are rough enough for good adhesion.

One of the novel improvements claimed here is for a weir modified structurally to cause a clogging agent to form a structure across the lower portion of the original weir. The upper part of this structure made by the clogging material will then act as a new weir. The bottom of the "notch" of this new weir formed by the clogging agent is more accurately placed (with respect to the average head) than was the original weir. A variety of shapes may be used to do this in various applications, and it is not intended that this claim be limited as to the original weir shape (except as already indicated), the nature of the clogging agent, or the purpose for which the flow is divided.

Also claimed is the process of forming these composite weirs and the process of dividing a flow stream using these composite weirs, this process utilizing the wide range of vertical self-adjustment possible with these weirs.

Also claimed are the apparatuses to divide a liquid stream into equal parts based on the employment of these devices or processes.

Also claimed are septic tank systems using these devices, processes or apparatus.

Thus this invention makes it possible to have accurate flow division with relatively inaccurate vertical placement of the flow dividing weirs. In the preferred embodiment shown, it does this and yet allows accurate flow division over two orders of magnitude in flow rate for flow containing a clogging agent.

This type of weir may be formed in the walls of a flow dividing container (as in a cooling tower), at the entrance to pipes leading from a flow dividing container (as in a septic system distribution box), or as an insert placed in pipes, conduits, pipe fittings, or flow channels.

An example of an application for this device is found in the distribution boxes used to divide the flow in septic systems 2 (see FIG. 3. These boxes are usually made of rough concrete with areas for the pipes knocked out of thin areas of the sidewalls using a hammer. The four inch pipes are then pushed through the holes and the open ends of the pipes form the flow dividing weirs. Obviously significant vertical alignment errors are virtually inevitable. An end cap 12 having a weir 10 11 of the type described for this invention can be installed at the end of each pipe. This will have a dramatic effect on the accuracy of flow division between the pipes in this application.

The novel elements that comprise this invention may be described in various ways. These novel elements include:

1. A multiple weir construction for providing division of a flow of liquid into equal parts, said construction comprising a flow delivery means delivering liquid to a liquid containing means, from which means two or more flow receiving means conduct liquid, and including a system of nearly identical flow dividing weirs such that at least one weir will be in the flow path between the flow delivery means and any flow receiving means, said system of flow dividing weirs being a multiple weir construction adapted to equally divide flows in liquid handling equipment; said multiple weir construction providing a set of weirs such that at least one weir will be between said flow delivery means and each of said flow receiving means, said weirs comprising an opening through a generally vertical wall member, said opening beginning at the bottom with a narrower width measured parallel to the wall and perpendicular to the flow, this narrower width being small enough to always become clogged by elements in the flow or by concommitant processes such as algae growth, the edges of the opening being such that the opening gradually gets wider toward the upper portions with this increase in width being at a rate slow enough to permit the accretion of the clogging agent to be capable of acting as a secondary weir across the opening at a variety of levels, and said increase in width being fast enough that there will always be a large fraction of the upper weir with a width too large for the said accretions to span without being torn away by the flow, and said width such that in those parts of the weir where the top of a secondary weir might be expected to form, the rate of said increase in width will increase with increasing height as measured from the bottom of the weir opening so that the accumulation of the clogging agent is able to grow or shrink gradually as the average liquid level in the container means rises and falls, at least one of said weirs being in the flow path between the said liquid supply means and each of said flow receiving means; thereby creating a multiple weir construction with weirs capable of supporting a secondary set of weirs derived from contaminants in the flow such that the flow over each said secondary weir in the said set of weirs will become nearly the same though the original weirs were mounted at differing elevations; also thereby providing a multiple weir construction which will provide substantially equal flows at various outlets though the vertical positions of the flow controlling weirs, with respect to the liquid surface, change slowly with time; also providing a set of weirs wherein the secondary weirs can not grow to fill the entire weir opening; and also providing a set of weirs wherein there will be a larger opening at the upper part of the weir capable of handling occasional high flow rates.

2. A multiple composite weir construction for providing division of a flow of liquid into equal parts, said construction comprising a flow delivery means delivering liquid to a liquid containing means, from which means two or more flow receiving means conduct liquid, and including a system of nearly identical flow dividing weirs such that at least one weir will be between the flow delivery means and any flow receiving means, said system of flow dividing weirs being a multiple weir construction adapted to equally divide flows in liquid handling equipment; said multiple weir construction providing a set of weirs such that at least one weir will be between said liquid supply means and each of said flow receiving means, said weirs comprising an original weir and a secondary weir grown in place, said original weir being an opening through a generally vertical wall member, said opening beginning at the bottom with a narrower width measured parallel to the wall and perpendicular to the flow, this narrower width being small enough to always become clogged by elements in the flow or by concommitant processes such as algae growth; the edges of the opening being such that the opening gradually gets wider toward the upper portions with this increase in width being at a rate slow enough to permit the accretion of the clogging agent to be capable of acting as a secondary weir across the opening at a variety of levels, and said increase in width being fast enough that there will always be a large fraction of the upper weir with a width too large for the said accretions to span without being torn away by the flow, and said width such that in those parts of the weir where the top of a secondary weir might be expected to form, the rate of said increase in width will increase with increasing height as measured from the bottom of the weir opening so that the accumulation of the clogging agent is able to grow or shrink gradually as the average liquid level in the container means rises and falls, the combination of the said original weir and the said secondary weir now being called a composite weir, at least one of said composite weirs being in the flow path between the said liquid supply means and each of said flow receiving means; and, thereby creating a multiple composite weir construction with original weirs capable of supporting a secondary set of weirs derived from contaminants in the flow such that the flow over each said secondary weir in the said set of weirs will become nearly the same though the said original weirs were mounted at differing elevations; also thereby providing a multiple weir construction which will provide substantially equal flows at various outlets though the vertical positions of the said original flow controlling weirs, with respect to the liquid surface, change slowly with time; also providing a set of composite weirs wherein the secondary weirs can not grow to fill the entire original weir opening; and also providing a set of weirs wherein there will be a larger opening at the upper part of the composite weir capable of handling occasional high flow rates.

3. A septic tank system comprising a septic tank, a distribution means receiving effluent from said tank, and multiple discharge means operatively connected into said distribution means for discharging effluent from the distribution means into pipes leading to subsurface absorption areas; and, in the flow path from the interior of said distribution means to the interior of said pipes, a multiple weir construction adapted to equally divide flows in liquid handling equipment such that at least one weir will be in the flow path between the distribution means and each said subsurface absorption area, said weirs comprising an opening through a generally vertical wall member on or operatively attached to the said distribution means, said opening being called the original weir and said opening beginning at the bottom with a narrower width measured parallel to the wall and perpendicular to the flow, this narrower width being small enough to always become clogged by elements in the flow or by concommitant processes such as algae growth, the edges of said opening being such that the opening gradually gets wider toward the upper portions, with this increase in width being at a rate slow enough that the accumulation of the clogging agent is capable of acting as a secondary weir across the opening, said secondary weir growing or shrinking gradually as the fluid level rises and falls by a substantial amount, but said increase in width being fast enough that the upper portions of the opening will be too wide to allow maintenance of said secondary weir, thereby creating a set of weirs such that the secondary weir of each of weir opening will tend to adjust for the fact that the said original weir opening might have been higher or lower, relative to the surface of the flowing liquid, than the other weir openings and thus causing equal flow division in spite of original vertical misalignment, and also thereby creating an apparatus which will provide substantially equal flows at various outlets though the original flow controlling weirs are at substantially different elevations relative to the liquid surface; thereby causing equal distribution to the various subsurface absorption areas in spite of sustantial vertical misalignment of the weirs or later tipping of the distribution means due to settling.

4. A septic tank system comprising a septic tank, a distribution means receiving effluent from said tank and multiple discharge means operatively connected into said distribution means for discharging effluent from the distribution means into pipes leading to subsurface absorption areas, and, in the flow path from the interior of said distribution means to the interior of said pipes, a composite multiple weir construction adapted to equally divide flows in liquid handling equipment such that at least one of of these weirs will be in the flow path between the distribution means and each said subsurface absorption area, said weirs comprised of an original weir and a secondary weir grown in place, such that the original weir is an opening through a generally vertical wall member on or operatively attached to the container means, said opening beginning at the bottom with a narrower width measured parallel to the wall and perpendicular to the flow, this narrower width being small enough to always become clogged by elements in the flow or by concommitant processes such as algae growth, the edges of said opening being such that the opening gradually gets wider toward the upper portions, this increase in width being at a rate slow enough to permit the accretions of the clogging agent to be capable of acting as a secondary weir across the opening; said rate of increase in width at the same time being fast enough that the accretions forming the secondary weir will be structurally unable to maintain such a secondary weir in the wider upper part of said opening, and such that said secondary weir will grow or shrink gradually as the average fluid level rises and falls, said growing and shrinking taking place over a substantial fraction of said weir opening; thereby creating a set of weirs, such that the secondary weir of each of which will tend to adjust for the fact that one original weir opening might have been substantially higher or lower than the other weir openings and by said adjustment these weirs will cause equal flow division, and thereby cause equal distribution of effluent to each subsurface wastewater disposal area.

5. A multiple weir construction for providing division of a flow of liquid into equal parts comprising a flow delivery means delivering liquid to a flow containing means from which means two or more flow receiving means conduct liquid, and including a system of flow dividing weirs such that at least one weir will be in the flow path between the flow delivery means and any flow receiving means, said system of flow dividing weirs employing a weir construction adapted to regulate liquid flow in fluids handling equipment and each weir comprising a generally vertical wall member having an opening therethrough extending longitudinally down said wall the lowest portion of the opening having a width determined to be at most 0.8 times the width across which contaminants in a flow through the opening could support a dam by adhering to the edges of the opening, said dam having a vertical dimension three or more times that width, and with the rest of the opening being formed such as to form curves which are monotonically increasing and curves such that the increase in opening width, x, at any point will be at least $By^{1.3}$ where y is increasing notch width above the bottom of the opening and B is some constant and x will be at most $By^4$.

6. A multiple composite weir construction for providing division of a flow of liquid into equal parts comprised of a flow delivery means delivering liquid to a flow containing means from which means two or more flow receiving means conduct liquid, and including a system of flow dividing weirs such that at least one weir will be in the flow path between the flow delivery means and any flow receiving means, said system of flow dividing weirs employing a composite weir construction adapted to regulate flow in fluids handling equipment; said composite weir comprising an original weir and a secondary weir grown in place, such that the original weir is an opening through a generally vertical wall member having an opening therethrough extending longitudinally down said wall, the lowest portion of the opening having a width determined to be at most 0.8 times the width across which contaminants in a flow through the opening could support a dam by adhering to the edges of the opening, said dam having a vertical dimension three or more times that width, and with the rest of the opening being formed so that the edges of the opening leading upward from the bottom of the opening form curves such that the increase in opening width, x, at any point will be an least $By^{1.3}$ where y is increasing height above the bottom of the opening and B is some constant, and x is at most $by^4$; this weir then supporting a secondary weir formed by accretions of some elements from the liquid having adhered to the opening, said secondary weir tending then to slowly follow any changes in fluid head by increasing its height for increasing average head, thereby creating an apparatus which will provide approximately equal flows at various outlets though the original flow controlling weirs are at substantially different elevations relative to the liquid surface.

7. A process for generating a weir construction capable of adjusting to compensate for errors in the vertical placement of one or more weir openings such that equal flow division is maintained, said process comprising the following steps:

A. having a multiple weir assembly all the weirs of which are similar, said weirs providing the outlets from some container means into which a liquid is flowing, B. said liquid having some elements therein which are capable of adhering to or growing on said weirs, C. said weirs having been so constructed that the accretions of adherent elements from the flow can partially block the lower portion of the weirs, but will not have the structural strength to maintain a blockage across the upper part of the weirs, the width of the weir openings increasing steadily from the lowest part of the weirs to the highest part of the operating portion of the weirs, said weirs being described as higher or lower meaning the relative elevations of the bottom of each weir as measured from the surface of the flowing liquid at each weir, D. the liquid is then allowed to flow so that said accretions build up on the weirs, with the liquid flowing over the accretions, E. the accretions then block the lower part of the weirs, causing an increase in the head of liquid in the container means and against the weirs, F. this increased head then causing the accretions to occur at higher levels on the weirs, G. these accretions then block still more of the weir, until H. the greater weir opening width for the lowest weir as measured at the liquid surface causes the uppermost part of that weir to lack the strength to bridge the gap and it breaks away and I. the liquid level drops slightly essentially stopping the accretion on all other weirs, but this fluid level allows the accretions to continue to rebuild the small top portion of the accretions that broke away on the lowest weir, very little accretions occurring on the higher weirs during this time, until J. this accretion on the lowest weir again loses a small amount of the top of the accretion across the opening, K. steps I and J are repeated again and again providing a condition where the top of the accretion across the opening in the lowest weir varies only slightly up and down, and the accretion across the others is largely confined to being just below the water line at low flows, this negative feedback mechanism then provides a set of weirs with their attendant accretions that operate so that L. the flows are divided essentially equally, in spite of the original construction having one weir lower that the others, and this condition remains until one or another weirs moves so as to become lower than the formerly lowest weir, said movement thereby causing M. that new lowest weir to undergo the same process of adjustment as did the original lowest weir, while N. any accretions on other weirs above the liquid line dry up, wither and otherwise become less so that O. the steps I and J will be repeated so that steps K and L are repeated for this new configuration so that this continuing process based on negative feedback continually adjusts to keep the tops of the accretions in the liquid at the same elevation, thereby causing the liquid flowing out of the container means over these accretions to be divided into equal streams though the weir elevations change substantially.

8. A process for generating a multiple weir construction capable of adjusting to compensate for errors in the vertical placement of one or more weir openings such that equal flow division is maintained; said process comprising the following steps:

A. having a multiple weir assembly all the weirs of which are similar, said weirs providing the outlets from some container means into which a liquid is flowing, each weir of which assembly being described as follows: a weir construction adapted to regulate liquid flow in fluids handling equipment comprising a generally vertical wall member having an opening therethrough extending longitudinally down said wall the lowest portion of the opening having a width determined to be at most 0.8 times the width across which contaminants in a flow through the opening could support a dam by adhering to the edges of the opening, said dam having a vertical dimension three or more times that width, and with the rest of the opening being formed such as to form curves which are monotonically increasing and curves such that the increase in opening width, x, at any point will be at least $By^{1.3}$ where y is increasing notch width above the bottom of the opening and B is some constant and x will be at most $By^4$, B. said liquid having some elements therein which are capable of adhering to or growing on said weirs, C. said weirs having been so constructed that the accretions of adherent elements from the flow can partially block the lower portion of the weirs, but will not have the structural strength to maintain a blockage across the upper part of the weirs, the width of the weir openings increasing steadily from the lowest part of the weirs to the highest part of the operating portion of the weirs, said weirs being described as higher or lower meaning the relative elevations of the bottom of each weir as measured from the surface of the flowing liquid at each weir, D. the liquid is then allowed to flow so that said accretions build up on the weirs, with the liquid flowing over the accretions, E. the accretions then block the lower part of the weirs, causing an increase in the head of liquid in the container means and against the weirs, F. this increased head then causing the accretions to occur at higher levels on the weirs, G. these accretions then block still more of the weir, until H. the greater weir opening width for the lowest weir as measured at the liquid surface causes the uppermost part of that weir to lack the strength to bridge the gap and it breaks away and I. the liquid level drops very slightly essentially stopping the accretion on all other weirs, but allowing it to continue to rebuild the small top portion of the accretions that broke away on the lowest weir, very little accretion occurring on the higher weirs during this time, J. this accretion on the lowest weir again loses a small amount of the top of the accretion across the opening, K. steps I and J are repeated again and again providing a condition where the top of the accretion across the opening in the lowest weir varies only slightly up and down, and the top of the accretion across the others is largely confined to being just below the surface of the liquid at low flows, this negative feedback mechanism then provides a set of weirs with their attendant accretions that operate so that L. the flows are divided essentially equally, in spite of the original construction having one weir lower that the others, and this condition remains until one or another weirs moves so as to become lower than the formerly lowest weir, said movement thereby causing M. that new lowest weir to undergo the same process of adjustment as did the original lowest weir, while N. any accretions on other weirs above the surface of the liquid dry up, wither and otherwise become less so that O. the steps I and J will be repeated so that steps K and L are repeated for this new configuration so that this continuing process based on negative feedback continually adjusts to keep the tops of the accretions in the liquid at the same elevation, thereby causing the liquid flowing out of the container means over these accretions to be divided into equal streams though the original weir elevations change substantially.

9. An apparatus for providing division of a flow of liquid into equal parts comprised of a flow delivery means delivering liquid to a flow containing means from which means two or more flow receiving means conduct liquid, and including a system of flow dividing weirs such that at least one weir will be in the flow path between the flow delivery means and any flow receiving means, said system of flow dividing weirs having been generated by a process for generating a weir construction capable of adjusting to compensate for errors in the vertical placement of one or more weir opening such that equal flow division is maintained, said process comprising the following steps:

A. having a multiple weir assembly all the weirs of which are similar, said weirs providing the outlet from some container means into which a liquid is flowing, B. said liquid having some elements therein which are capable of adhering to or growing on said weirs, C. said weirs having been so constructed that the accretions of adherent elements from the flow can partially block the lower portion of the weirs, but said accretions will not have the structural strength to maintain a blockage across the upper part of the weirs, the width of the weir openings increasing steadily from the lowest part of the weirs to the highest part of the operating portion of the weirs, said weirs being described as higher or lower meaning the relative elevations of the bottom of each weir as measured from the surface of the flowing fluid at each weir, D. the liquid is then allowed to flow so that said accretions build up on the weirs, with the liquid flowing over the accretions, E. the accretions then block the lower part of the weirs, causing an increase in the head of liquid in the container means and against the weirs, F. this increased head then causing the accretions to occur at higher levels on the weirs, G. these accretions then block still more of the weir, until H. the greater weir opening width for the lowest weir as measured at the liquid surface causes the uppermost part of that weir to lack the strength to bridge the gap and it breaks away and I. the liquid level drops very slightly essentially stopping the accretion on all other weirs, but allowing it to continue to rebuild the small top portion of the accretions that broke away on the lowest weir, very little additional accretion occurring on the higher weirs during this time, J. this accretion on the lowest weir again loses a small amount of the top of the accretion across the opening, K. steps I and J are repeated again and again thereby providing a condition where the top of the accretion across the opening in the lowest weir varies only slightly up and down, and the accretion across the others is largely confined to being just below the surface of the liquid at low flows, this negative feedback mechanism then provides a set of weirs with their attendant accretions that operate so that L. the flows are divided essentially equally, in spite of the original construction having one weir lower than the others, and this condition remains until one or another weirs moves so as to become lower than the formerly lowest weir, said movement thereby causing M. the accretions on that new lowest weir to undergo the same process of adjustment as did the original lowest weir, while N. any accretions on other weirs above the surface of the liquid dry up, wither and otherwise become less so that O. the steps I and J will be repeated so that steps K and L are repeated for this new configuration so that this continuing process based on negative feedback continually adjusts to keep the tops of the accretions in the weir openings at the same elevation thereby causing the liquid flowing out of the container means over these accretions to be divided into equal streams though the weir elevations change;

thereby resulting in an apparatus which self-adjusts for substantially altered elevation of one of the outlet weirs so that the flows to various outlets will again be nearly equal.

10. An apparatus for providing division of a flow of liquid into equal parts comprised of a flow delivery means or pipe delivering liquid to a flow containing means from which means two or more flow receiving means conduct liquid, and including a system of flow dividing weirs such that at least one weir will be in the flow path between the flow delivery means and any flow receiving means, said system of flow dividing weirs having been generated by a process for generating a multiple weir construction capable of adjusting to compensate for errors in the vertical placement of one or more weir openings such that equal flow division is maintained, said process comprising the following steps:

A. having a multiple weir assembly all the weirs of which are similar, said weirs providing the outlet from some container means into which a liquid is flowing, each weir of which assembly being described as follows: a weir construction adapted to regulate liquid flow in liquids handling equipment comprising a generally vertical wall member having an opening therethrough extending longitudinally down said wall the lowest portion of said opening having a width determined to be at most 0.8 times the width across which contaminants in a flow through the opening could support a dam by adhering to the edges of the opening, said dam having a vertical dimension three or more times that width, and with the rest of the opening being formed such as to form curves which are monotonically increasing and curves such that the increase in opening width, x, at any point will be at least $By^{1.3}$ where y is increasing notch width above the bottom of the opening and B is some constant and x will be at most $By^4$, B. said liquid having some elements therein which are capable of adhering to or growing on said weirs, C. said weirs having been so constructed that the accretions of adherent elements from the flow can partially block the lower portion of the weirs, but will not have the structural strength to maintain a blockage across the upper part of the weirs, the width of the weir openings increasing steadily from the lowest part of the weirs to the highest part of the operating portion of the weirs, said weirs being described as higher or lower meaning the relative elevations of the bottom of each weir as measured from the surface of the flowing liquid at each weir, D. the liquid is then allowed to flow so that said accretions build up on the weirs, with the liquid flowing over the accretions, E. the accretions then block the lower part of the weirs, causing an increase in the head of liquid in the container means and against the weirs, F. this increased head then causing the accretions to occur at higher levels on the weirs, G. these accretions then block still more of the weir, until H. the greater weir opening width for the lowest weir as measured at the liquid surface causes the uppermost part of that weir to lack the strength to bridge the gap and it breaks away I. the liquid level drops very slightly essentially stopping the accretion on all other weirs, but allowing it to continue to rebuild the small top portion of the accretions that broke away on the lowest weir, very little additional accretion occurring on the higher weirs during this time, J. this accretion on the lowest weir again loses a small amount of the top of the accretion across the opening, K. steps I and J are repeated again and again thereby providing a condition where the top of the accretion across the opening in the lowest weir varies only slightly up and down, and the accretion across the others is largely confined to being just below the liquid surface at low flows, this negative feedback mechanism then provides a set of weirs with their attendant accretions that operate so that L. the flows are divided essentially equally, in spite of the original construction having one weir lower that the others, and this condition remains until one or another weirs moves so as to become lower than the formerly lowest weir, said movement thereby causing M. that new lowest weir to undergo the same process of adjustment as did the original lowest weir, while N. any accretions on other weirs above the liquid surface dry up, wither and otherwise become less so that O. the steps I and J will be repeated so that steps K and L are repeated for this new configuration so that this continuing process based on negative feedback continually adjusts to keep the tops of the accretions in the liquid at the same elevation thereby causing the liquid flowing out of the container means over these accretions to be divided into equal streams though the weir elevations change;

thereby resulting in an apparatus which self-adjusts for substantially altered elevation of one of the outlet weirs so that the flows to various outlets will again be nearly equal.

11. In a septic tank system comprising a septic tank, a distribution means receiving effluent from said tank and multiple discharge means operatively connected into said distribution means for discharging effluent from the distribution means into pipes leading to subsurface absorption areas, in the flow path from the interior of said distribution means to the interior of said pipes, a composite multiple weir construction adapted to equally divide flows in fluid handling equipment said weir construction is generated by a process for generating a weir construction capable of adjusting to compensate for substantial errors in the vertical placement of one or more weir openings such that equal flow division is maintained, said process comprising the following steps:

A. having a multiple weir assembly all the weirs of which are similar, said weirs providing the outlet from some container means into which the effluent liquid is flowing, B. said liquid having some elements therein which are capable of adhering to or growing on said weirs, C. said weirs having been so constructed that the accretions of adherent elements from the flow can partially block the lower portion of the weirs, but said accretions will not have the structural strength to maintain a blockage across the upper part of the weirs, the width of the weir openings increasing steadily from the lowest part of the weirs to the highest part of the operating portion of the weirs, said weirs being described as higher or lower meaning the relative elevations of the bottom of each weir as measured from the surface of the flowing liquid at each weir, D. the liquid is then allowed to flow so that said accretions build up on the weirs, with the liquid flowing over the accretions, E. the accretions then block the lower part of the weirs, causing an increase in the head of liquid in the container means and against the weirs, F. this increased head then causing the accretions to occur at higher levels on the weirs, G. these accretions then block stillmore of the weir, until H. the greater weir opening width for the lowest weir as measured at the liquid surface causes the uppermost part of that weir to lack the strength to bridge the gap and it breaks away I. the liquid level drops very slightly essentially stopping the accretion on all other weirs, but allowing it to continue to rebuild the small top portion of the accretions that broke away on the lowest weir, very little accretion occurring on the higher weirs during this time, J. this accretion on the lowest weir again loses a small amount of the top of the accretion across the opening, K. steps I and J are repeated again and again thereby providing a condition where the top of the accretion across the opening in the lowest weir varies only slightly up and down, and the accretion across the others is largely confined to being just below the water line at low flows, this negative feedback mechanism then provides a set of weirs with their attendant accretions that operate so that L. the flows are divided essentially equally, in spite of the original construction having one weir lower that the others, and this condition remains until one or another weirs moves so as to become lower than the formerly lowest weir, said movement thereby causing M. that new lowest weir to undergo the same process of adjustment as did the original lowest weir, while N. any accretions on other weirs above the surface of the liquid dry up, wither and otherwise become less so that O. the steps I and J will be repeated so that steps K and L are repeated for this new configuration so that this continuing process based on negative feedback continually adjusts to keep the tops of the accretions in the middle of the weir openings at the same elevation thereby causing the liquid flowing out of the container means over these accretions to be divided into equal streams though the weir elevations change;

thereby resulting in an apparatus which self-adjusts for substantially altered elevation of one of the outlet weirs so that the flows to various outlets will again be nearly equal, and thereby causing equal flow to each subsurface absorption area in the septic system.

12. A method for providing division of a flow of liquid into equal parts using a process which both establishes the final apparatus shape and adjusts that shape for later changes in outlet elevations, said method employing an apparatus comprised of a flow delivery means delivering liquid to a flow containing means from which means two or more flow receiving means conduct liquid, and including a system of flow dividing weirs such that at least one weir will be in the flow path between the flow delivery means and any flow receiving means, said system of flow dividing weirs having been generated by a process for generating a weir construction capable of adjusting to compensate for errors in the vertical placement of one or more weir openings such that equal flow division is maintained, said process comprising the following steps:

A. having a multiple weir assembly all the weirs of which are similar, said weirs providing the outlet from some container means into which a liquid is flowing, B. said liquid having some elements therein which are capable of adhering to or growing on said weirs, C. said weirs having been so constructed that the accretions of adherent elements from the flow can partially block the lower portion of the weirs, but said accretions will not have the structural strength to maintain a blockage across the upper part of the weirs, the width of the weir openings increasing steadily from the lowest part of the weirs to the highest part of the operating portion of the weirs, said weirs being described as higher or lower meaning the relative elevations of the bottom of each weir as measured from the surface of the flowing fluid at each weir, D. the liquid is then allowed to flow so that said accretions build up on the weirs, with the liquid flowing over the accretions, E. the accretions then block the lower part of the weirs, causing an increase in the head of liquid in the container means and against the weirs, F. this increased head then causing the accretions to occur at higher levels on the weirs, G. these accretions then block still more of the weir, until H. the greater weir opening width for the lowest weir as measured at the liquid surface causes the uppermost part of that weir to lack the strength to bridge the gap and it breaks away and I. the liquid level drops very slightly essentially stopping the accretion on all other weirs, but allowing it to continue to rebuild the small top portion of the accretions that broke away on the lowest weir, very little additional accretion occurring on the higher weirs during this time, J. this accretion on the lowest weir again loses a small amount of the top of the accretion across the opening, K. steps I and J are repeated again and again thereby providing a condition where the top of the accretion across the opening in the lowest weir varies only slightly up and down, and the accretion across the others is largely confined to being just below the surface of the liquid at low flows, this negative feedback mechanism then provides a set of weirs with their attendant accretions that operate so that L. the flows are divided essentially equally, in spite of the original construction having one weir lower than the others, and this conditions remains until one or another weirs moves so as to become lower than the formerly lowest weir, said movement thereby causing M. the accretions on that new lowest weir to undergo the same process of adjustment as did the original lowest weir, while N. any accretions on other weirs above the surface of the liquid dry up, wither and otherwise become less so that O. the steps I and J will be repeated so that steps K and L are repeated for this new configuration so that this continuing process based on negative feedback continually adjusts to keep the tops of the accretions in the weir openings at the same elevation thereby causing the liquid flowing out of the container means over these accretions to be divided into equal streams though the weir elevations change;

thereby resulting in a process which self-adjusts for substantially altered elevation of one of the outlet weirs so that the flows to various outlets will again be nearly equal, this same process thereby causing the original flow to be equally divided in spite of changes in outlet elevations.

13. A multiple weir construction for providing division of a flow of liquid into equal parts comprised of a flow delivery means delivering liquid to a flow containing means from which means two or more flow receiving means conduct liquid, and including a system of flow dividing weirs such that at least one weir will be in the flow path between the flow delivery means and any flow receiving means, said system of flow dividing weirs employing a weir construction adapted to regulate flows in liquid handling equipment and comprising a generally vertical wall member having an opening therethrough extending longitudinally down said wall, said opening being such that when said weir construction is used with other similar weir constructions to divide the flow into equal parts, the lower portion of said weir constructions will become partially clogged by contaminants in the fluid such that the contaminants will modify the shape of the opening in such a way as to compensate for any substantial initial difference in elevations of the weirs, thereby making the flow division more nearly equal over a wide range of flows.

14. A septic tank system comprising a septic tank, a distribution means receiving effluent from said tank and multiple discharge means operatively connected into said distribution means for discharging effluent from the distribution means into pipes leading to subsurface absorption areas, and, in the flow path from the interior of said distribution means to the interior of said pipes, a composite multiple weir construction adapted to equally divide flows in liquid handling equipment, said weir construction comprising a weir construction adapted to regulate liquid flow in liquids handling equipment, each weir of said multiple weir construction comprising a generally vertical wall member having an opening therethrough extending longitudinally down said wall, said opening being such that when said weir construction is used with other similar weir constructions to divide the flow into equal parts, the lower portion of said weir constructions will become partially clogged by contaminants in the fluid such that the contaminants will modify the shape of the opening in such a way as to compensate for substantial difference in elevations of the weirs; thereby making the flow division more nearly equal over a wide range of flows, thereby causing nearly equal flow to each subsurface absorption area in the septic system.

15. A method for providing division of a flow of liquid into equal parts using a process which both establishes the final apparatus shape and adjusts that shape for later changes in outlet elevations, said method employing an apparatus comprised of a flow delivery means delivering liquid to a flow containing means from which means two or more flow receiving means conduct liquid, and including a system of flow dividing weirs such that at least one weir will be in the flow path between the flow delivery means and any flow receiving means, said system of flow dividing weirs having been generated by a process for generating a weir construction capable of adjusting to compensate for errors in the vertical placement of one or more weir openings such that equal flow division is maintained, said process comprising the following steps:

A. having a multiple weir assembly all the weirs of which are similar, said weirs providing the outlet from some container means into which a liquid is flowing, B. said liquid having some elements therein which are capable of adhering to or growing on said weirs, C. said weirs having been so constructed that the accretions of adherent elements from the flow can partially block the lower portion of the weirs, but said accretions will not have the structural strength to maintain a blockage across the upper part of the weirs, the width of the weir openings increasing steadily from the lowest part of the weirs to the highest part of the operating portion of the weirs, said weirs being described as higher or lower meaning the relative elevations of the bottom of each weir as measured from the surface of the flowing fluid at each weir, D. the liquid is then allowed to flow so that said accretions build up on the weirs, with the liquid flowing over the accretions, E. the accretions then block the lower part of the weirs, causing an increase in the head of liquid in the container means and against the weirs, F. this increased head then causing the accretions to occur at higher levels on the weirs, G. these accretions then block still more of the weir, until H. the greater weir opening width for the lowest weir as measured at the liquid surface causes the uppermost part of that weir to lack the strength to bridge the gap and it breaks away and I. the liquid level drops very slightly essentially stopping the accretion on all other weirs, but allowing it to continue to rebuild the small top portion of the accretions that broke away on the lowest weir, very little additional accretion occurring on the higher weirs during this time, J. this accretion on the lowest weir again loses a small amount of the top of the accretion across the opening, K. steps I and J are repeated again and again thereby providing a condition where the top of the accretion across the opening in the lowest weir varies only slightly up and down, and the accretion across the others is largely confined to being just below the surface of the liquid at low flows, this negative feedback mechanism then provides a set of weirs with their attendant accretions that operate so that L. the flows are divided essentially equally, in spite of the original construction having one weir lower than the others, and this condition remains until one or another weirs moves so as to become lower than the formerly lowest weir, said movement thereby causing M. the accretions on that new lowest weir to undergo the same process of adjustment as did the original lowest weir, while N. any accretions on other weirs above the surface of the liquid dry up, wither and otherwise become less so that O. the steps I and J will be repeated so that steps K and L are repeated for this new configuration so that this continuing process based on negative feedback continually adjusts to keep the tops of the accretions in the weir openings at the same elevation thereby causing the liquid flowing out of the container means over these accretions to be divided into equal streams though the weir elevations change;

thereby resulting in a process which self-adjusts for substantially altered elevation of one of the outlet weirs so that the flows to various outlets will again be nearly equal, this same process thereby causing the original flow to be equally divided in spite of changes in outlet elevations.

16. In a septic tank system comprising a septic tank, a distribution means receiving effluent liquid from said tank and multiple discharge means operatively connected into said distribution means for discharging effluent liquid from the distribution means into pipes leaning to subsurface absorption areas, and in which the vertical placement of the outlets of said distribution means are relatively inaccurate or changing with time, a process for providing division of a flow of effluent liquid from the septic tank into equal parts using a process which both establishes the final apparatus shape and adjusts that shape for later changes in outlet elevations, said process employing an apparatus comprised of a flow delivery means delivering liquid to a flow containing means from which means two or more flow receiving means conduct liquid, and including a system of flow dividing weirs such that at least one weir will be in the flow path between the flow delivery means and any flow receiving means, said system of flow dividing weirs being capable of adjusting to compensate for errors in the vertical placement of one or more weir openings such that equal flow division is maintained and having been generated as a part of the said process, said process comprising the following steps:

A. having a multiple weir assembly all the weirs of which are similar, said weirs providing the outlet from some container means into which a liquid is flowing, B. said liquid having some elements therein which are capable of adhering to or growing on said weirs, C. said weirs having been so constructed that the accretions of adherent elements from the flow can partially block the lower portion of the weirs, but said accretions will not have the structural strength to maintain a blockage across the upper part of the weirs, the width of the weir openings increasing steadily from the lowest part of the weirs to the highest part of the operating portion of the weirs, said weirs being described as higher or lower meaning the relative elevations of the bottom of each weir as measured from the surface of the flowing liquid at each weir, D. the liquid is then allowed to flow so that said accretions build up on the weirs, with the liquid flowing over the accretions, E. the accretions then block the lower part of the weirs, causing an increase in the head of liquid in the container means and against the weirs, F. this increased head then causing the accretions to occur at higher levels on the weirs, G. these accretions then block still more of the weir, until H. the greater weir opening width for the lowest weir as measured at the liquid surface causes the uppermost part of that weir to lack the strength to bridge the gap and it breaks away and I. the liquid level drops very slightly essentially stopping the accretion on all other weirs, but allowing it to continue to rebuild the small top portion of the accretions that broke away on the lowest weir, very little additional accretion occurring on the higher weirs during this time, J. this accretion on the lowest weir again loses a small amount of the top of the accretion across the opening, K. steps I and J are repeated again and again thereby providing a condition where the top of the accretion across the opening in the lowest weir varies only slightly up and down, and the accretion across the others is largely confined to being just below the surface of the liquid at low flows, this negative feedback mechanism then provides a set of weirs with their attendant accretions that operate so that L. the flows are divided essentially equally, in spite of the original construction having one weir lower than the others, and this condition remains until one or another weirs moves so as to become lower than the formerly lowest weir, said movement thereby causing M. the accretions on that new lowest weir to undergo the same process of adjustment as did the original lowest weir, while N. any accretions on other weirs above the surface of the liquid dry up, wither and otherwise become less so that O. the steps I and J will be repeated so that steps K and L are repeated for this new configuration so that this continuing process based on negative feedback continually adjusts to keep the tops of the accretions in the weir openings at the same elevation thereby causing the liquid flowing out of the container means over these accretions to be divided into equal streams though the weir elevations change;

thereby resulting in a process which self-adjusts for substantially altered elevation of one of the outlet weirs so that the flows to various outlets will again be nearly equal, this same process thereby causing the original flow to be equally divided in spite of changes in outlet elevations.

17. In a septic tank system comprising a septic tank, a distribution means receiving effluent liquid from said tank and multiple discharge means operatively connected into said distribution means for discharging effluent liquid from the distribution means into pipes leaning to subsurface absorption areas, and in which the vertical placement of the outlets of said distribution means are relatively inaccurate or changing with time, a process for generating a weir construction capable of adjusting to compensate for errors in the vertical placement of one or more weir openings such that equal flow division is maintained, said process comprising the following steps:

A. having a multiple weir assembly all the weirs of which are similar, said weirs providing the outlets from some container means into which a liquid is flowing, B. said liquid having some elements therein which are capable of adhering to or growing on said weirs, C. said weirs having been so constructed that the accretions of adherent elements from the flow can partially block the lower portion of the weirs, but will not have the structural strength to maintain a blockage across the upper part of the weirs, the width of the weir openings increasing steadily from the lowest part of the weirs to the highest part of the operating portion of the weirs, said weirs being described as higher or lower meaning the relative elevations of the bottom of each weir as measured from the surface of the flowing liquid at each weir, D. the liquid is then allowed to flow so that said accretions build up on the weirs, with the liquid flowing over the accretions, E. the accretions then block the lower part of the weirs, causing an increase in the head of liquid in the container means and against the weirs, F. this increased head then causing the accretions to occur at higher levels on the weirs, G. these accretions then block still more of the weir, until H. the greater weir opening width for the lowest weir as measured at the liquid surface causes the uppermost part of that weir to lack the strength to bridge the gap and it breaks away and I. the liquid level drops slightly essentially stopping the accretion on all other weirs, but this liquid level allows the accretions to continue to rebuild the small top portion of the accretions that broke away on the lowest weir, very little accretions occurring on the higher weirs during this time, until J. this accretion on the lowest weir again loses a small amount of the top of the accretion across the opening, K. steps I and J are repeated again and again providing a condition where the top of the accretion across the opening in the lowest weir varies only slightly up and down, and the accretion across the others is largely confined to being just below the water line at low flows, this negative feedback mechanism then provides a set of weirs with their attendant accretions that operate so that L. the flows are divided essentially equally, in spite of the original construction having one weir lower that the others, and this condition remains until one or another weirs moves so as to become lower than the formerly lowest weir, said movement thereby causing M. that new lowest weir to undergo the same process of adjustment as did the original lowest weir, while N. any accretions on other weirs above the liquid surface dry up, wither and otherwise become less so that O. the steps I and J will be repeated so that steps K and L are repeated for this new configuration so that this continuing process based on negative feedback continually adjusts to keep the tops of the accretions in the effluent liquid at the same elevation, thereby causing the liquid flowing out of the container means over these accretions to be divided into equal streams though the weir elevations change substantially.

18. A multiple weir construction for providing division of a flow of liquid into equal parts comprising a flow delivery means delivering liquid to a flow containing means from which means two or more flow receiving means conduct liquid, and including a system of flow dividing weirs such that at least one weir will be in the flow path between the flow delivery means and any flow receiving means, said system of flow dividing weirs employing a weir construction adapted to regulate liquid flow in fluids handling equipment and comprising a generally vertical wall member having an opening therethrough extending longitudinally down said wall the lowest portion of the opening having a width determined to be at most 0.8 times the width across which contaminants in a flow through the opening could support a dam by adhering to the edges of the opening, said dam having a vertical dimension three or more times that width, and with the rest of said opening being formed such that the width of said opening is an increasing function of distance from the bottom of said opening, and formed such that the rate of increase in said width is itself an increasing function of distance from the bottom of said opening.

19. A multiple composite weir construction for providing division of a flow of liquid into equal parts comprised of a flow delivery means delivering liquid to a flow containing means from which means two or more flow receiving means conduct liquid, and including a system of flow dividing weirs such that at least one weir will be in the flow path between the flow delivery means and any flow receiving means, said system of flow dividing weirs employing a composite weir construction adapted to regulate flow in liquids handling equipment; said composite weir comprising an original weir and a secondary weir grown in place, such that the original weir is an opening through a generally vertical wall member having an opening therethrough extending longitudinally down said wall, the lowest portion of the opening having a width determined to be at most 0.8 times the width across which contaminants in a flow through the opening could support a dam by adhering to the edges of the opening, said dam having a vertical dimension three or more times that width, and with the rest of the opening being formed such that the width of said opening is an increasing function of distance from the bottom of said opening, and formed such that the rate of increase in width of the opening is also an increasing function of the distance from the bottom of said opening; this weir then supporting a secondary weir formed by accretions of some elements from the liquid having adhered to the opening, said secondary weir tending then to slowly follow any changes in fluid head by increasing its height for increasing average head, thereby creating an apparatus which will provide approximately equal flows at various outlets though the original flow controlling weirs are at substantially different elevations relative to the liquid surface.

20. In a septic tank system comprising a septic tank, a distribution means receiving effluent liquid from said tank and multiple discharge means operatively connected into said distribution means for discharging effluent from the distribution means into pipes leading to subsurface absorption areas; a multiple weir construction for providing division of a flow of liquid into equal parts, said multiple weir construction comprised of a flow delivery means delivering liquid to a flow containing means from which flow containing means two or more flow receiving means conduct liquid, and including a system of flow dividing weirs such that at least one weir will be in the flow path between the flow delivery means and any flow receiving means, said system of flow dividing weirs employing a weir construction adapted to regulate flow in liquids handling equipment; each of said weirs comprising an opening through a generally vertical wall member on or attached to the container means, having an opening therethrough extending longitudinally down said wall, the lowest portion of the opening having a width determined to be at most 0.8 times the width across which contaminants in a flow through the opening could support a dam by adhering to the edges of said opening, said dam having a vertical dimension three or more times that width, and with the rest of said opening being formed such that the width of said opening is an increasing function of distance from the bottom of said opening, and formed such that the rate of increase in width of the opening is also an increasing function of the distance from the bottom of said opening; this weir then supporting a secondary weir formed by accretions of some elements from the liquid having adhered to the opening, said secondary weir tending then to slowly follow any changes in fluid head by increasing its height for increasing average head; thereby creating an apparatus which will provide approximately equal flows at various outlets though the original flow controlling weirs are at substantially different elevations relative to the liquid surface, and thereby separating the septic tank effluent into equal parts for distribution to various subsurface absorption areas.

21. In a septic tank system comprising a septic tank, a distribution means receiving effluent from said tank, and multiple discharge means operatively connected into said distribution means for discharging effluent from the distribution means into pipes leading to subsurface absorption areas; in the flow path from the interior of said distribution means to the interior of said pipes, a composite multiple weir construction adapted to equally divide flows in liquid handling equipment; said weir construction is generated by a process for generating a weir construction capable of adjusting to compensate for substantial errors in the vertical placement of one or more weir openings such that equal flow division is maintained, said process comprising the following steps:

A. having a multiple weir assembly all the weirs of which are similar, said weirs providing the outlet from some container means into which a liquid is flowing, each weir of which assembly being described as follows: a weir construction adapted to regulate liquid flow in liquids handling equipment comprising a generally vertical wall member having an opening therethrough extending longitudinally down said wall the lowest portion of said opening having a width determined to be at most 0.8 times the width across which contaminants in a flow through the opening could support a dam by adhering to the edges of the opening, said dam having a vertical dimension three or more times that width, and with the rest of the opening being formed such as to form curves which are monotonically increasing and curves such that the increase in opening width, x, at any point will be at least $By^{1.3}$ where y is increasing notch width above the bottom of the opening and B is some constant and x will be at most $By^4$, B. said liquid having some elements therein which are capable of adhering to or growing on said weirs, C. said weirs having been so constructed that the accretions of adherent elements from the flow can partially block the lower portion of the weirs, but will not have the structural strength to maintain a blockage across the upper part of the weirs, the width of the weir openings increasing steadily from the lowest part of the weirs to the highest part of the operating portion of the weirs, said weirs being described as higher or lower meaning the relative elevations of the bottom of each weir as measured from the surface of the flowing liquid at each weir, D. the liquid is then allowed to flow so that said accretions build up on the weirs, with the liquid flowing over the accretions, E. the accretions then block the lower part of the weirs, causing an increase in the head of liquid in the container means and against the weirs, F. this increased head then causing the accretions to occur at higher levels on the weirs, G. these accretions then block still more of the weir, until H. the greater weir opening width for the lowest weir as measured at the liquid surface causes the uppermost part of that weir to lack the strength to bridge the gap and it breaks away I. the liquid level drops very slightly essentially stopping the accretion on all other weirs, but allowing it to continue to rebuild the small top portion of the accretions that broke away on the lowest weir, very little additional accretion occurring on the higher weirs during this time, J. this accretion on the lowest weir again loses a small amount of the top of the accretion across the opening, K. steps I and J are repeated again and again thereby providing a condition where the top of the accretion across the opening in the lowest weir varies only slightly up and down, and the accretion across the others is largely confined to being just below the liquid surface at low flows, this negative feedback mechanism then provides a set of weirs with their attendant accretions that operate so that L. the flows are divided essentially equally, in spite of the original construction having one weir lower that the others, and this condition remains until one or another weirs moves so as to become lower than the formerly lowest weir, said movement thereby causing M. that new lowest weir to undergo the same process of adjustment as did the original lowest weir, while N. any accretions on other weirs above the liquid surface dry up, wither and otherwise become less so that O. the steps I and J will be repeated so that steps K and L are repeated for this new configuration so that this continuing process based on negative feedback continually adjusts to keep the tops of the accretions in the liquid at the same elevation thereby causing the liquid flowing out of the container means over these accretions to be divided into equal streams though the weir elevations change;

thereby resulting in an apparatus which self-adjusts for substantially altered elevation of one of the outlet weirs so that the flows to various outlets will again be nearly equal, and thereby providing equal distribution of effluent to the outlets leading to the various subsurface absorption areas.

22. In a septic tank system comprising a septic tank, a distribution means receiving effluent liquid from said tank and multiple discharge means operatively connected into said distribution means for discharging effluent from the distribution means into pipes leading to subsurface absorption areas; a multiple composite weir construction for providing division of a flow of liquid into equal parts comprised of a flow delivery means delivering liquid to a flow containing means from which means two or more flow receiving means conduct liquid, and including a system of flow dividing weirs such that at least one weir will be in the flow path between the flow delivery means and any flow receiving means, said system of flow dividing weirs employing a composite weir construction adapted to regulate flow in liquids handling equipment; said composite weir comprising an original weir and a secondary weir grown in place, such that the original weir is an opening through a generally vertical wall member having an opening therethrough extending longitudinally down said wall, the lowest portion of the opening having a width determined to be at most 0.8 times the width across which contaminants in a flow through the opening could support a dam by adhering to the edges of the opening, said dam having a vertical dimension three or more times that width, and with the rest of the opening being formed so that the edges of the opening leading upward from the bottom of the opening form curves such that the increase in opening width, x, at any point will be an least $By^{1.3}$ where y is increasing height above the bottom of the opening and B is some constant, and x is at most $by^4$; this weir then supporting a secondary weir formed by accretions of some elements from the liquid having adhered to the opening, said secondary weir tending then to slowly follow any changes in fluid head by increasing its height for increasing average head, thereby creating an apparatus which will provide approximately equal flows at various outlets though the original flow controlling weirs are at substantially different elevations relative to the liquid surface, and thereby causing the flow of effluent from the septic tank to be equally divided among the various subsurface absorption areas.

23. In a septic tank system comprising a septic tank, a distribution means receiving effluent liquid from said tank and multiple discharge means operatively connected into said distribution means for discharging effluent from the distribution means into pipes leading to subsurface absorption areas; a multiple weir construction for providing division of a flow of liquid into equal parts comprised of a flow delivery means delivering liquid to a flow containing means from which means two or more flow receiving means conduct liquid, and including a system of flow dividing weirs such that at least one weir will be in the flow path between the flow delivery means and any flow receiving means, said system of flow dividing weirs employing a weir construction adapted to regulate flow in liquids handling equipment; said weirs each comprising an opening through a generally vertical wall member having an opening therethrough extending longitudinally down said wall, such that the average height of said opening is at least three times the average width of said opening; thereby providing a means for reducing the effect on the outlet flows of vertical misplacement of the outlets from the said distribution means so that the flows to the various subsurface absorption areas will be more nearly equal in spite of vertical misalignment of the outlets.

24. In a septic tank system comprising a septic tank, a distribution means receiving effluent liquid from said tank and multiple discharge means operatively connected into said distribution means for discharging effluent from the distribution means into pipes leading to subsurface absorption areas; a multiple weir construction for providing division of a flow of liquid into equal parts comprised of a flow delivery means delivering liquid to a flow containing means from which means two or more flow receiving means conduct liquid, and including a system of flow dividing weirs such that at least one weir will be in the flow path between the flow delivery means and any flow receiving means, said system of flow dividing weirs employing a weir construction adapted to regulate flow in liquids handling equipment; said weirs each comprising an opening through a generally vertical wall member having an opening therethrough extending longitudinally down said wall, such that the average height of said opening is at least three times the average width of said opening and such that the portion of the opening experiencing the flow of liquid has an increase in width with increasing height as measured from the bottom of said opening, said increase in width being equal to or greater than zero; thereby providing a means by which the effect on the outlet flows of vertical misplacement of the outlets from the said distribution means so that the flows to the various subsurface absorption areas will be more nearly equal in spite of vertical misalignment of the outlets.

25. In a septic tank system comprising a septic tank, a distribution means receiving effluent liquid from said tank and multiple discharge means operatively connected into said distribution means for discharging effluent liquid from the distribution means into pipes leading to subsurface absorption areas; a multiple weir construction for providing division of a flow of liquid into equal parts; said multiple weir construction comprising a flow delivery means delivering liquid to a flow containing means from which means two or more flow receiving means conduct liquid, and including a system of flow dividing weirs such that at least one weir will be in the flow path between the flow delivery means and any flow receiving means, said system of flow dividing weirs employing a weir construction adapted to regulate liquid flow in fluids handling equipment, each weir of said multiple weir construction comprising a generally vertical wall member having an opening therethrough extending longitudinally down said wall the lowest portion of the opening having a width determined to be at most 0.8 times the width across which contaminants in a flow through the opening could support a dam by adhering to the edges of the opening, said dam having a vertical dimension three or more times that width, and with the rest of the opening being formed such as to form curves which are monotonically increasing and curves such that the increase in opening width, x, at any point will be at least $By^{1.3}$ where y is increasing notch width above the bottom of the opening and B is some constant and x will be at most $By^4$; thereby providing a flow division means which will provide approximately equal flows at various outlets though the original flow controlling weirs were at substantially different elevations relative to the liquid surface and thereby separating the septic tank effluent into equal parts for distribution to various subsurface absorption areas.

34. A multiple weir construction for providing division of a flow of liquid into equal parts comprised of a flow delivery means delivering liquid to a flow containing means from which means two or more flow receiving means conduct liquid, and including a system of flow dividing weirs such that at least one weir will be in the flow path between the flow delivery means and any flow receiving means, said system of flow dividing weirs employing a weir construction adapted to regulate flows in liquid handling equipment and comprising a generally vertical wall member having an opening therethrough extending longitudinally down said wall, said opening being such that when said weir construction is used with other similar weir constructions to divide the flow into equal parts, the lower portion of said weir constructions will become partially clogged by contaminants in the fluid such that the contaminants will modify the shape of the opening in such a way as to compensate for any substantial initial difference in elevations of the weirs, thereby making the flow division more nearly equal over a wide range of flows. Obviously, this invention is not limited in terms of the materials from which it is fabricated, flexible or otherwise. It is not limited in terms of the devices or processes in which it can be used except as already described.

I claim:

1. A septic tank system having a septic tank, a distribution means receiving effluent liquid from said septic tank, and multiple discharge means for discharging effluent from said distribution means; a multiple weir assembly adapted to provide division of flow of effluent liquid from said distribution means into equal parts, said multiple weir assembly including a plurality of flow dividing weirs wherein at least one weir will be in the flow path between said distribution means and a flow receiving means; each of said flow dividing weirs having an opening through a generally vertical wall surface, a lowest portion of said opening having a minimum width less than 0.8 times the width across which contaminants in a flow of said effluent liquid through the opening can support a dam by adhering to edges of said opening, said dam having a vertical dimension at least three times said minimum width, said opening being formed such that said width of said opening increases as a function of the distance from the bottom of said opening, a rate of increase in the width of said opening being an increasing function of the distance from the bottom of said opening; said weir supporting a secondary weir formed by accretions of said contaminants from the liquid adhering to said opening, said secondary weir following changes in fluid head by increasing its height for increasing average head; thereby forming an apparatus which will provide generally equal flows at various outlets through said flow dividing weirs, and thereby separating the septic tank effluent into equal parts for distribution to various subsurface absorption areas.

2. The septic tank system of claim 1 wherein said edges of said flow dividing weir openings are roughened to provide increased adherence of said contaminants to said edges.

* * * * *